United States Patent [19]

Lun Ho et al.

[11] 4,260,208
[45] Apr. 7, 1981

[54] MANUFACTURING FIXTURE AND SUPPORT FOR MAGNETIC DISC

[75] Inventors: Bin Lun Ho, Los Gatos; Albert Guerini, Gilroy, both of Calif.

[73] Assignee: PRIAM, Cupertino, Calif.

[21] Appl. No.: 6,861

[22] Filed: Jan. 26, 1979

[51] Int. Cl.³ .................. A47B 88/00; A47F 3/04
[52] U.S. Cl. .................. 312/242; 312/236; 312/311; 312/350; 312/352; 248/632
[58] Field of Search .............. 312/242, 257 SK, 257 R, 312/263, 236, 205, 183, 330 R, 334, 339, 350, 351, 140.4, 352, 213, 311; 248/632

[56] References Cited

U.S. PATENT DOCUMENTS

| | | | |
|---|---|---|---|
| 886,192 | 4/1908 | DeCanio | 312/339 |
| 995,410 | 6/1911 | McClure | 312/140.4 |
| 1,890,743 | 12/1932 | Murphy et al. | 312/140.4 |
| 1,944,477 | 1/1934 | Tillotson, Jr. | 312/350 |
| 2,014,466 | 9/1935 | Cheyney | 248/632 |
| 2,329,201 | 9/1943 | Jonas | 312/184 |
| 2,433,509 | 12/1947 | Drescher | 248/632 |
| 2,486,764 | 11/1949 | Singer | 312/339 |
| 2,826,475 | 3/1958 | Larson | 312/236 |
| 3,030,165 | 4/1962 | Nagy | 312/311 |
| 3,072,452 | 1/1963 | Sleeper | 312/311 |
| 3,192,306 | 6/1965 | Skonnord | 312/213 |
| 3,208,456 | 9/1965 | Peebles | 312/184 |
| 3,285,683 | 11/1966 | Middleton et al. | 312/339 |
| 3,482,895 | 12/1969 | Becklin | 312/352 |
| 4,012,089 | 3/1977 | Ward | 312/236 |

*Primary Examiner*—Victor N. Sakran
*Attorney, Agent, or Firm*—Flehr, Hohbach, Test

[57] ABSTRACT

A support frame for electronic equipment such as a magnetic disc drive which can function also as a manufacturing fixture. The frame includes front and rear vertical members which each comprise a generally rectangularly shaped rod. Rods are attached to the sides and the bottom of the front and rear members, and brackets are attached to the side rods for supportably receiving the magnetic disc drive. Advantageously, the fixture facilitates air flow around the electronic equipment when housed in a storage cabinet.

11 Claims, 4 Drawing Figures

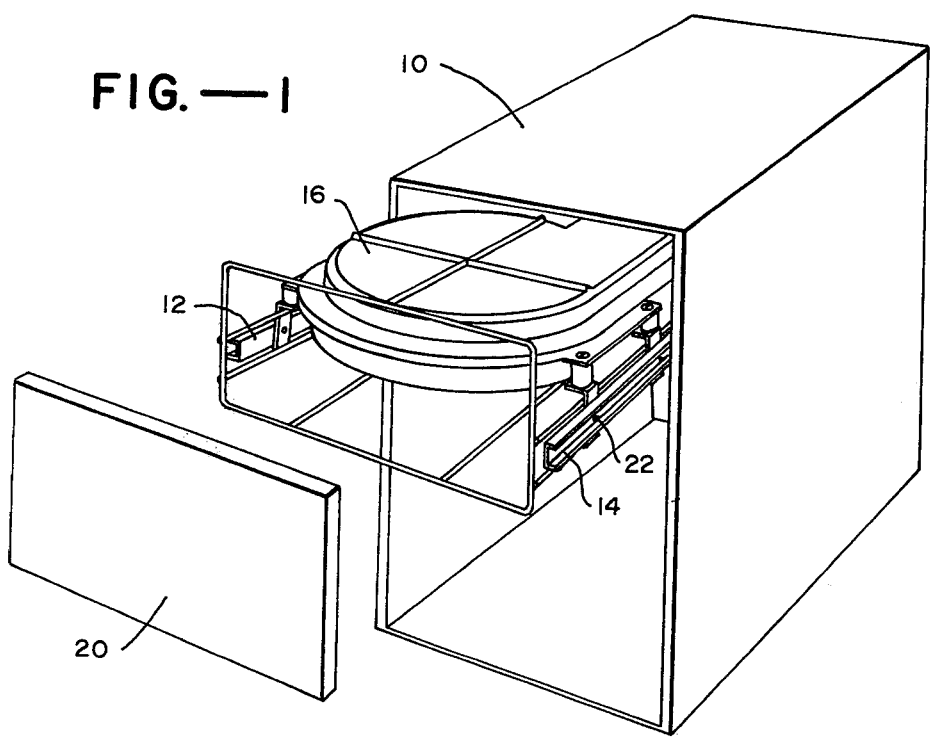
FIG.—1
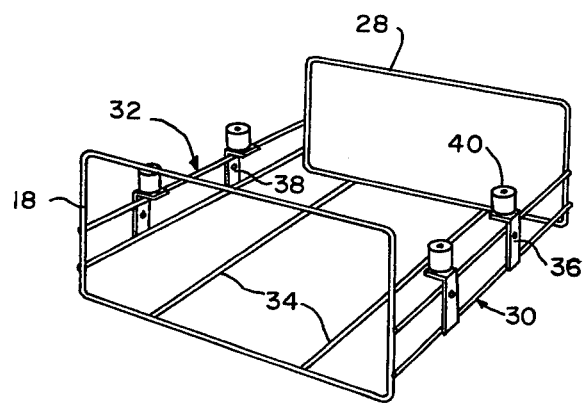
FIG.—2

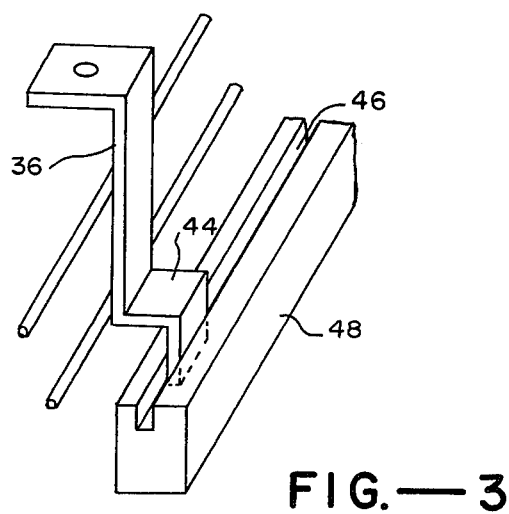
FIG.—3
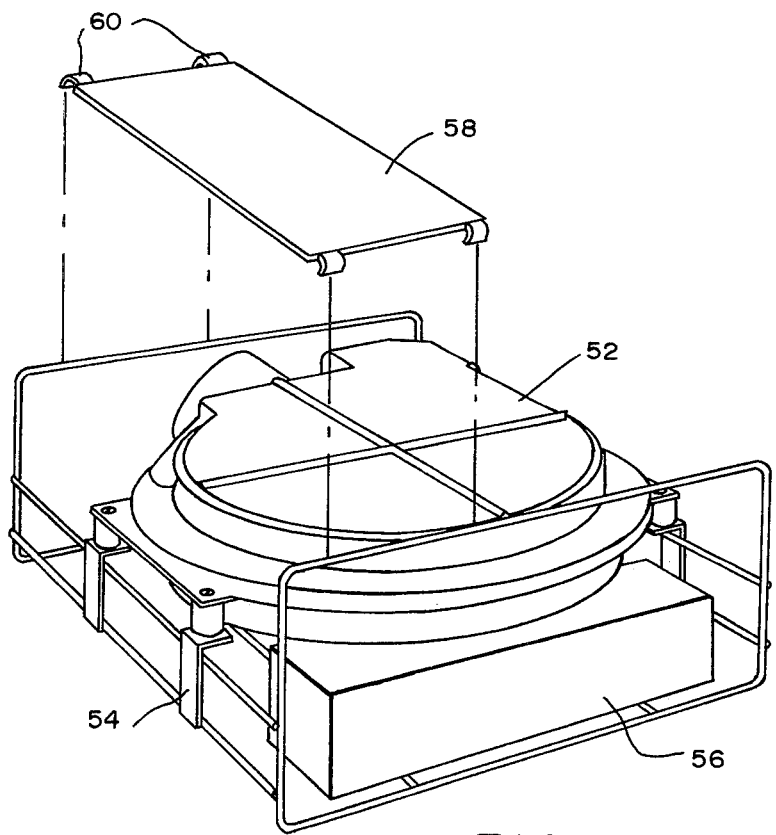
FIG.—4

MANUFACTURING FIXTURE AND SUPPORT FOR MAGNETIC DISC

This patent application is related to the following copending applications: "Linear Actuator for Magnetic Disc Drive", Ho and Dong, Ser. No. 006,775, filed Jan. 26, 1979, "Enclosed Disc Drive with Improved Air Flow", Ho and Bibby, Ser. No. 006,776 filed Jan. 26, 1979, and "Linear Actuator Including Limit Stop Assembly", Ho and Guerini, Ser. No. 006,777 filed Jan. 26, 1979.

This invention relates generally to manufacturing fixtures and support frames, and more particularly the invention relates to fixtures and support frames which are useful for housing electronic equipment.

Electronic equipment is typically assembled in compact packages which are stored in enclosed cabinets. The cabinets typically include slidable racks which receive the packages whereby the equipment can be pulled out of the cabinet for servicing and pushed back into the cabinet for storage and normal operation.

Heretofore, electronic equipment packages have been assembled in temporary holding fixtures during manufacturing, and the assembled equipment is transferred to sheet metal boxes for mounting in the storage cabinets. Such boxes are relatively expensive to manufacture, are heavy, and necessitate the transfer of equipment from temporary manufacturing fixtures in final assembly of the cabinets. Further, air flow within the cabinets can be impeded by the boxes thus reducing heat transfer from the electronic equipment.

An object of the present invention is an improved manufacturing fixture and support frame for electronic equipment.

Another object of the invention is a support frame which is readily manufactured and is light in weight.

Yet another object of the invention is a storage cabinet including a support frame for electronic equipment which facilitates air flow within the cabinet.

Briefly, in accordance with the invention, the manufacturing fixture and support frame includes front and rear vertical members in spaced, parallel alignment with each of the members comprising a generally rectangularly shaped rod. A plurality of rods are attached to the front and rear members and positioned on either side of the members and on the bottom of the members. A plurality of brackets are attached to the rods which are positioned on either side of the front and rear vertical members with the brackets including a support surface for receiving the electronic equipment.

Advantageously, the fixture can be used for the assembly of electronic equipment in manufacturing and transferred directly to a storage cabinet for supporting the assembled equipment in the cabinet. The final housing for the electronic equipment in accordance with the invention includes a cabinet with a plurality of pairs of slide members slidably supported by the cabinet, and the support frame which is attached directly to a pair of slide members, thus obviating the need for transfer of the assembled equipment from a temporary fixture to a container or box within the housing cabinet.

The invention and objects and features thereof will be more readily apparent from the following detailed description and claims when taken with the drawing.

In the drawings,

FIG. 1 is a perspective view of a housing for electronic equipment in accordance with the invention with the support frame and electronic equipment pulled out of the cabinet as for servicing.

FIG. 2 is a perspective view of one embodiment of a manufacturing fixture and support frame in accordance with the invention.

FIG. 3 is a perspective view of a portion of the support frame illustrating the attachment of the support frame to a slide member in accordance with one embodiment of the invention.

FIG. 4 is a partially exploded perspective view of a magnetic disc file assembled in the support frame illustrated in FIG. 2.

Referring now to the drawings, FIG. 1 is a perspective view of an equipment housing in accordance with the invention including a cabinet 10 having a pair of linearly slidable rail members 12 and 14 on which is mounted electronic equipment such as a magnetic disc file as shown at 16. Disc file 16 is mounted on a support frame including a front vertical member 18. A front panel 20, normally attached to the front member 18, is shown removed to facilitate illustration of the housing. The support frame is attached to the rail members by means of fastener 22. In the illustrated position the electronic equipment is removed from the cabinet for ease of access in mounting or servicing the equipment. In normal operation the equipment is placed within cabinet 10 by sliding support members 12 and 14 inwardly.

FIG. 2 is a perspective view of the support frame of FIG. 1 with the disc file and other electronic equipment removed. The frame includes the front vertical member 18 and a rear vertical member 28. Each of the two vertical members comprise a generally rectangularly shaped steel rod which is shaped and welded in the desired configuration. The rods are of sufficient diameter to support the electronic equipment mounted to the frame. A first and second plurality of rods 30, 32 are attached to the front and rear members and positioned to either side of the members. Another plurality of rods 34 are attached to the bottom of the vertical members 18 and 28. The rods are preferably attached by welding.

Brackets 36 are attached to the pair of rods 30, and brackets 38 are attached to the pair of rods 32 on the opposite side of the frame. Each bracket includes an angled support surface which receives rubber shock mounts 40 on which the electronic equipment is mounted for shock absorption and electrical isolation.

As noted in FIG. 1, the support frame may be attached to the slide members of the housing cabinet by means of a bolt fastener 22. However, in an alternative embodiment as illustrated in FIG. 3, each bracket 36 may be provided with an offset portion 44 which can be received in a slot 46 in the slide member 48. Such an arrangement permits the electronic equipment to be easily removed from the slide member for servicing and repositioned on the slide members for reassembly of the equipment in the housing.

A support frame in accordance with the invention lends itself to service as a manufacturing fixture to which the various electronic components may be assembled during manufacturing. Referring to FIG. 4, a disc file assembly is shown in partially exploded view to illustrate the versatility of the fixture and compactness of assembled electronic equipment using the manufacturing fixture as the equipment support frame. In this illustration an enclosed disc file 52 is shown mounted on the brackets 54 of the frame with a power supply chassis 56 mounted on the bottom rails of the frame beneath the disc file 52, and a printed circuit board 58 including logic and control circuitry of a servo mechanism drive mounted above disc 52 by means of fasteners 60 which engage the front and rear vertical members of the support frame.

The fixture and support frame is readily manufactured, is light weight, and facilitates air flow around the electronic equipment when placed in a storage cabinet. The frame readily lends itself to use in manufacture and assembly of the electronic equipment and thus obviates the need for repackaging the equipment when mounted in the sotrage cabinet. The frame can be employed as part of a desk top unit by mounting a cover directly to the front and rear members or by attaching the cover to the isolation mounts.

While the invention has been described with reference to a specific embodiment, the description is illustrative of the invention and is not to be construed as limiting the scope of the invention. Various modifications and applications may occur to those skilled in the art without departing from the true spirit and scope of the invention as defined by the appended claims.

What is claimed is:

1. A manufacturing fixture and support frame for a magnetic disc and like electronic devices comprising
   front and rear vertical members in spaced, parallel alignment, each of said members comprising a generally rectangularly shaped rod,
   a plurality of rods attached to said front and rear members and positioned on either side of said members and on the bottom of said members,
   a plurality of brackets attached to said rods positioned on either side of said members, said brackets including a support surface intermediate the top and bottom of said members for supportably receiving the magnetic disc whereby said magnetic disc is intermediate the top and bottom of said vertical members,
   means for attaching a printed circuit board to the top of said vertical members, and
   means for attaching a chassis to said rods on the bottom of said members.

2. A manufacturing fixture and support frame as defined by claim 1 further including isolation mounts on said support surfaces for providing shock absorption and electrical isolation for the magnetic disc.

3. A manufacturing support frame as defined by claim 2 and further including means for receiving a cover for use of said frame in a desk top unit.

4. A manufacturing support frame as defined by claim 1 and further including a front panel attached to said front vertical member.

5. A manufacturing support frame as defined by claim 1 wherein said plurality of brackets include means for mating with slide members of an equipment cabinet.

6. A manufacturing support frame as defined by claim 5 wherein said means for mating includes an offset portion on each bracket.

7. A housing for electronic equipment such as a magnetic disc comprising a cabinet, at least one pair of slide members for receiving electronic equipment, said slide members being supported by said cabinet wherein electronic equipment can slide out of said cabinet for access to said equipment and can slide into said cabinet for storage, a support frame for receiving electronic equipment and for attachment to said pair of slide members, said support frame including front and rear vertical members in spaced, parallel alignment, each of said members comprising a generally rectangularly shaped rod, a plurality of rods attached to said front and rear members and positioned on either side of said members and on the bottom of said members, and a plurality of brackets attached to said rods positioned on either side of said members, said brackets including a support surface intermediate the top and bottom of said members and means for engaging said pair of slide members, means for attaching a printed circuit board to the top of said vertical members, means for attaching a magnetic disc to said support surfaces whereby said magnetic disc is intermediate the top and bottom of said vertical members, and means for attaching a chassis to said rods on the bottom of said members.

8. A housing for electronic equipment as defined by claim 7 wherein each of said brackets includes a support surface for supportably receiving a magnetic disc drive and the like.

9. A housing for electronic equipment as defined by claim 8 and further including a front panel attached to said front vertical member.

10. A housing for electronic equipment as defined by claim 7 wherein said means for mating includes an offset portion of each bracket.

11. A housing for electronic equipment as defined by claim 7 wherein said means for mounting includes mechanical fasteners for attaching said slide members to said brackets.

* * * * *